United States Patent
Nolan et al.

(10) Patent No.: US 7,384,699 B2
(45) Date of Patent: Jun. 10, 2008

(54) MAGNETIC RECORDING MEDIA WITH TUNED EXCHANGE COUPLING AND METHOD FOR FABRICATING SAME

(75) Inventors: Thomas Patrick Nolan, Fremont, CA (US); Samuel Dacke Harkness, IV, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 424 days.

(21) Appl. No.: 10/902,956

(22) Filed: Aug. 2, 2004

(65) Prior Publication Data

US 2006/0024432 A1 Feb. 2, 2006

(51) Int. Cl.
G11B 5/66 (2006.01)
(52) U.S. Cl. .................................................. 428/829
(58) Field of Classification Search ................ None
See application file for complete search history.

(56) References Cited

U.S. PATENT DOCUMENTS

| | | | |
|---|---|---|---|
| 5,045,165 A * | 9/1991 | Yamashita | 204/192.16 |
| 6,468,670 B1 | 10/2002 | Ikeda et al. | |
| 6,534,203 B2 | 3/2003 | Iwasaki et al. | |
| 6,602,612 B2 | 8/2003 | Abarra et al. | |
| 6,602,621 B2 | 8/2003 | Matsunuma et al. | |
| 6,777,112 B1 * | 8/2004 | Girt et al. | 428/828 |
| 6,881,495 B2 * | 4/2005 | Kikitsu et al. | 428/827 |
| 7,147,942 B2 * | 12/2006 | Uwazumi et al. | 428/831.2 |
| 7,201,977 B2 * | 4/2007 | Li et al. | 428/829 |
| 7,261,958 B2 * | 8/2007 | Hirayama et al. | 428/829 |
| 2007/0172705 A1 * | 7/2007 | Weller et al. | 428/827 |

* cited by examiner

*Primary Examiner*—Holly Rickman
(74) *Attorney, Agent, or Firm*—McDermott Will & Emery LLP

(57) ABSTRACT

A magnetic recording medium with tuned exchange coupling comprises:
(a) a non-magnetic substrate having a surface; and
(b) a stack of thin film layers on the substrate surface, including:
   (i) a compositionally segregated, exchange decoupled magnetic layer with substantially non-magnetic grain boundaries; and
   (ii) an exchange coupled magnetic layer adjacent to and in direct contact with the exchange decoupled magnetic layer.

23 Claims, 1 Drawing Sheet

MAGNETIC RECORDING MEDIA WITH TUNED EXCHANGE COUPLING AND METHOD FOR FABRICATING SAME

FIELD OF THE INVENTION

The present invention relates to magnetic recording media with tuned exchange coupling between exchange decoupled and exchange coupled magnetic layers, and a method for manufacturing same. The invention enjoys particular utility in the fabrication of high performance magnetic data/information storage and retrieval media, e.g., hard disks.

BACKGROUND OF THE INVENTION

In fabricating high signal-to-noise ratio (SNR) magnetic recording media, it is desirable that the magnetic particles or grains of the magnetic layer(s) be of uniformly small size, with a small, uniform amount of exchange coupling between the magnetic particles or grains. The optimal value of the exchange coupling is different for longitudinal, perpendicular, tilted, and heat-assisted magnetic recording media, e.g., a higher exchange coupling is desired for perpendicular media. However, in each instance a constant small value of exchange coupling between neighboring magnetic particles or grains is desired.

A low value (i.e., small amount) of exchange coupling between neighboring magnetic particles or grains is desired in order that magnetic switching of the magnetic particles or grains does not become too highly correlated. Reducing the exchange coupling decreases the sizes of the magnetic particles or grains, i.e., the sizes of the magnetic switching units. The cross-track correlation length and media noise are correspondingly reduced. However, near-zero exchange coupling between magnetic particles or grains produces a very low squareness-sheared M-H hysteresis loop, a broad switching field distribution, decreased resistance to self-demagnetization and thermal decay, and low nucleation fields ($H_n$) in perpendicular media designs. Non-uniform exchange coupling allows some magnetic particles or grains to act independently, with small particle or grain size, while other magnetic particles or grains act in clusters, resulting in broad distributions of particle or grain size and anisotropy field.

Heretofore, exchange coupling between neighboring magnetic particles or grains has been controlled by preferentially forming non-ferromagnetic material(s) at the boundaries between the magnetic particles or grains. Such non-ferromagnetic material may be formed during the sputter deposition of CoCrPtB-containing magnetic alloys on high temperature substrates by preferential surface diffusion of Cr and B atoms to the grain boundaries. The concentration of Co atoms varies between the centers of the magnetic particles or grains and the boundaries, such that a transition from magnetic to non-magnetic composition occurs. Exchange coupling in such compositionally segregated media is typically controlled by changing process parameters such as the Cr and B concentrations of the sputtering target and the substrate temperature during deposition.

Non-ferromagnetic material can also be formed at the boundaries between magnetic particles or grains during sputter deposition of CoPt-containing magnetic alloys on low temperature substrates by incorporation of a metal oxide material in the CoPt-based sputter target or by reactive sputtering of the target in a sputter gas containing oxygen ($O_2$). Exchange coupling in magnetic media produced thereby is controlled by changing process parameters such as the sputter gas pressure, $O_2$ concentration in the sputter gas, and oxide content of the sputter target.

In each of the above-described instances, the sputter deposition parameters are adjusted/selected such that the amount of non-ferromagnetic material present at the boundaries between the magnetic particles or grains is sufficient to effect significant, but not complete, decoupling of the magnetic exchange between the particles or grains.

However, a problem associated with the above-described method/procedure for effecting exchange decoupling is that the magnetic exchange between a pair of magnetic particles or grains is extremely sensitive to, thus dependent upon, the arrangement of a very small number of atoms. As a consequence, the amount of exchange coupling between pairs of magnetic particles or grains exhibits considerable variation, whereby some particles or grains are more strongly coupled than others.

Another problem associated with the above-described method/procedure for effecting exchange decoupling is that radial diffusion profiles of the atoms of the segregated elements (Cr and B) or molecules (e.g., metal oxides) depend upon the sizes of the magnetic particles or grains. Consequently, the larger magnetic particles or grains can have a systematically different composition than the smaller particles or grains, and therefore a systematically different amount of exchange coupling and magnetic anisotropy.

Still another problem associated with the above-described methodologies is that the composition of the entire film, including the ferromagnetic particles or grains, the weakly exchange coupled ferromagnetic regions between neighboring magnetic particles or grains, and the exchange decoupling non-ferromagnetic regions between neighboring magnetic particles or grains is substantially the same, except for the preferential transport (i.e., diffusion) of certain atomic species (e.g., Cr and B) or molecules (metal oxides). Changing the amount of exchange coupling in the magnetic film or layer generally changes the composition of the magnetic particles or grains in addition to that of the boundary material. Thus, it is difficult to separately optimize the properties of each component of the magnetic film or layer.

In view of the foregoing, there exists a clear need for improved methodology for fabricating high performance, high SNR magnetic recording media which avoids or otherwise obviates the above-described disadvantages, drawbacks, and problems associated with the conventional methodology and facilitates fabrication of improved high performance magnetic recording media, including longitudinal, perpendicular, tilted, and heat-assisted media.

The present invention, therefore, addresses and solves the above need for improved methodology for fabricating high performance, high SNR magnetic recording media with enhanced magnetic characteristics, while maintaining full compatibility with all aspects of conventional automated manufacturing technology for fabrication of magnetic recording media, e.g., hard disks. Moreover, the inventive methodology can be readily implemented in a cost-effective manner comparable with that of existing manufacturing methodologies.

DISCLOSURE OF THE INVENTION

An advantage of the present invention is improved magnetic recording media with tuned exchange coupling.

Another advantage of the present invention is improved perpendicular magnetic recording media with tuned exchange coupling.

Yet another advantage of the present invention is improved longitudinal magnetic recording media with tuned exchange coupling.

Still another advantage of the present invention is an improved method for fabricating magnetic recording media with tuned exchange coupling.

A further advantage of the present invention is an improved method for fabricating perpendicular magnetic recording media with tuned exchange coupling.

A still further advantage of the present invention is an improved method for fabricating longitudinal magnetic recording media with tuned exchange coupling.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to an aspect of the present invention, the foregoing and other advantages are obtained in part by a magnetic recording medium with tuned exchange coupling, comprising:

(a) a non-magnetic substrate having a surface; and
(b) a stack of thin film layers on the surface of the substrate, the layer stack including:
  (i) an exchange decoupled magnetic layer; and
  (ii) an exchange coupled magnetic layer adjacent to the exchange decoupled magnetic layer and formed in direct physical contact therewith.

According to certain embodiments of the invention, the exchange decoupled magnetic layer is proximal the substrate and the exchange coupled magnetic layer is distal the substrate; whereas, according to other embodiments of the invention, the exchange coupled magnetic layer is proximal the substrate and the exchange decoupled magnetic layer is distal the substrate.

In accordance with principles of the invention, the amount of exchange coupling between magnetic grains or particles of the exchange decoupled magnetic layer is less than optimal for the medium; and the amount of exchange coupling between magnetic grains or particles of the exchange coupled magnetic layer is greater than optimal for the medium.

According to embodiments of the invention, the magnetic grains or particles of the exchange decoupled magnetic layer are weakly exchange coupled via a pathway extending through the exchange coupled magnetic layer; the exchange decoupled magnetic layer comprises a compositionally segregated microstructure wherein magnetic grains or particles thereof contain relatively higher concentrations of magnetic elements, boundaries between the magnetic grains or particles contain relatively higher concentrations of non-magnetic elements, and the boundaries comprise a substantially non-magnetic material. Preferably, the exchange decoupled magnetic layer comprises a Co—Pt ferromagnetic alloy including at least one other non-magnetic element, the magnetic grains or particles contain relatively higher concentrations of Co and Pt, and the boundaries contain relatively higher concentrations of the at least one other non-magnetic element and a relatively lower concentration of Co.

The exchange coupled magnetic layer preferably comprises a non-compositionally or less compositionally segregated microstructure than the exchange decoupled magnetic layer, substantially all of the magnetic grains or particles of the exchange coupled magnetic layer are exchange coupled, and the concentrations of non-magnetic elements at boundaries between the magnetic grains or particles is relatively lower than at the boundaries of the exchange decoupled magnetic layer, or substantially zero. Preferably, the exchange coupled layer comprises a Co—Pt ferromagnetic alloy including at least one other non-magnetic element.

According to embodiments of the invention, the medium is a perpendicular magnetic recording medium and the layer stack includes a soft magnetic underlayer and crystal orienting seed and underlayers below the exchange decoupled and exchange coupled magnetic layers. Preferably, the layer stack includes an hcp Ru-alloy underlayer with an hcp <0001> preferred growth orientation; the exchange decoupled magnetic layer is compositionally segregated and grown on the underlayer with an hcp <0001> preferred growth orientation, comprises a Co—Pt magnetic alloy including at least one other non-magnetic element, the magnetic grains or particles contain relatively higher concentrations of Co and Pt, the boundaries of the exchange decoupled magnetic layer contain relatively higher concentrations of the at least one other non-magnetic element and a relatively lower concentration of Co, and are substantially non-magnetic.

According to these embodiments, the exchange coupled magnetic layer has an hcp <0001> preferred growth orientation, comprises a Co—Pt alloy with >~15 at. % Pt, has a non-compositionally or less compositionally segregated microstructure than the exchange decoupled magnetic layer, and the boundaries thereof contain relatively lower concentrations of the at least one other non-magnetic element and Co.

Preferably, the concentration of Pt in each of the Co—Pt magnetic alloys is >~15 at. %, the Co—Pt alloy of the exchange decoupled magnetic layer further comprises >~15 at. % Cr, and the substantially non-magnetic boundaries thereof include >~20 at % Cr. Preferably, the boundaries of the exchange decoupled magnetic layer comprise a non-magnetic oxide of Co or another metal and the boundaries of the exchange coupled magnetic layer are substantially free of non-magnetic oxide material.

Preferably, the non-magnetic oxide at the boundaries of the exchange decoupled magnetic layer is amorphous, the boundaries occupy >~10 vol. % of the exchange decoupled magnetic layer, and substantially no amorphous non-magnetic oxide is present in the exchange coupled magnetic layer.

According to preferable embodiments of the present invention, the exchange decoupled magnetic layer has a thickness from about 5 to about 25 nm; the exchange coupled magnetic layer is from about 1 to about 4 nm thick; $H_c$ of the exchange decoupled magnetic layer is >~4,000 Oe and $H_n$ of the exchange decoupled magnetic layer is <25% of $H_c$; and $H_c$ of the medium is from about 5,000 to about 12,000 Oe, $H_n$ of the medium is from about 1,000 to about 3,000 Oe, and squareness S of the medium is >0.95.

In accordance with other embodiments of the present invention, the medium is a longitudinal magnetic recording medium and the layer stack includes crystal orienting seed and underlayers below the exchange decoupled and exchange coupled magnetic layers.

According to preferred embodiments of the invention, the seed and underlayers include a Cr-alloy seed layer having a bcc <200> preferred growth orientation and an underlayer of a non-magnetic hcp material oriented with a <11.0> or <10.0> preferred growth direction; the exchange decoupled magnetic layer is compositionally segregated and grown on the underlayer with a <11.0> or <10.0> preferred growth direction, comprises a Co—Pt alloy including at least one other non-magnetic element, the magnetic grains or particles contain relatively higher concentrations of Co and Pt, the boundaries of the exchange decoupled magnetic layer contain relatively higher concentrations of the at least one other non-magnetic element and a relatively lower concentration of Co, and are substantially non-magnetic.

The exchange coupled magnetic layer preferably comprises a Co—Pt alloy with a <11.0> or <10.0> preferred growth direction with a relatively lower amount or none of the at least one other non-magnetic element, is non-compositionally segregated or less compositionally segregated than the exchange decoupled layer, and the boundaries thereof contain relatively lower concentrations or none of the at least one other non-magnetic element and Co.

Preferably, the Co—Pt alloy of the exchange decoupled magnetic layer comprises a CoCrPtB alloy with >~10 at. % Pt, >~10 at. % Cr, and >~5% B; the boundaries of the exchange decoupled magnetic layer include >~15 at. % Cr and >~8 at. % B; and the Co—Pt alloy of the exchange coupled magnetic layer comprises a Co—Pt alloy with >~10 at. % Pt, and lesser amounts of or no Cr and B.

Preferred embodiments of the invention include those wherein the substantially non-magnetic boundaries comprise >~10 vol. % of the exchange decoupled magnetic layer and include >~20 at. % Cr, the substantially non-magnetic boundaries are amorphous, the exchange decoupled magnetic layer is from about 10 to about 25 nm thick and has a $H_c$>~4,000 Oe, and the exchange coupled magnetic layer is from about 1 to about 4 nm thick.

Media according to the invention further comprise:
(c) a protective overcoat layer on the layer stack; and
(d) a lubricant topcoat on the protective overcoat layer.

Another aspect of the present invention is a method of fabricating a magnetic recording medium with tuned exchange coupling, comprising steps of:
(a) providing a non-magnetic substrate with one or more layers formed thereon, selected from the group consisting of: seed layers, underlayers, and interlayers; and
(b) forming a stack of thin film layers on the substrate, the layer stack including:
  (i) an exchange decoupled magnetic layer; and
  (ii) an exchange coupled magnetic layer adjacent to the exchange decoupled magnetic layer and formed in direct physical contact therewith.

According to certain embodiments of the present invention, step (b) comprises forming the exchange decoupled magnetic layer proximal the substrate and the exchange coupled magnetic layer distal the substrate; whereas, according to other embodiments of the invention, step (b) comprises forming the exchange coupled magnetic layer proximal the substrate and the exchange decoupled magnetic layer distal the substrate.

In accordance with principles of the invention, step (b) comprises forming the exchange decoupled magnetic layer with an amount of exchange coupling between magnetic grains or particles which is less than optimal for the medium, and forming the exchange coupled magnetic layer with an amount of exchange coupling between magnetic grains or particles which is greater than optimal for the medium.

According to the invention, step (b) preferably comprises forming the exchange decoupled magnetic layer such that the magnetic grains or particles are weakly exchange coupled via a pathway extending through the exchange coupled magnetic layer, and step (b) further comprises controllably tuning the exchange coupling of the layer stack by selecting the thickness of the exchange coupled magnetic layer, i.e., step (b) comprises increasing the exchange coupling of the layer stack by increasing the thickness of the exchange coupled magnetic layer.

In accordance with embodiments of the invention, step (b) preferably comprises forming an exchange decoupled magnetic layer with a compositionally segregated microstructure wherein magnetic grains or particles thereof contain relatively higher concentrations of magnetic elements, boundaries between the magnetic grains or particles contain relatively higher concentrations of non-magnetic elements, and the boundaries comprise a substantially non-magnetic material.

Preferably, step (b) comprises forming a compositionally segregated exchange decoupled magnetic layer comprised of a Co—Pt ferromagnetic alloy including at least one other non-magnetic element, the magnetic grains or particles contain relatively higher concentrations of Co and Pt, and the boundaries contain relatively higher concentrations of the at least one other non-magnetic element and a relatively lower concentration of Co.

According to certain embodiments of the present invention, step (b) comprises depositing the compositionally segregated exchange decoupled magnetic layer by reactive sputtering of a Co—Pt target to form non-magnetic CoO at the boundaries; whereas, according to other embodiments, step (b) comprises depositing the compositionally segregated exchange decoupled magnetic layer by sputtering of a Co—Pt target comprising an oxide to form a non-magnetic oxide material at the boundaries.

In accordance with further embodiments of the present invention, step (b) comprises depositing the compositionally segregated exchange decoupled magnetic layer by sputtering a Co—Pt target with >15 at. % in a high sputter gas pressure atmosphere >~20 mTorr and onto an unheated substrate; whereas, according to still further embodiments of the invention, step (b) comprises depositing the compositionally segregated exchange decoupled magnetic layer by sputtering a CoCrPt target with >~15 at. % Pt and >~15 at. % Cr in a low sputter gas pressure atmosphere <~10 mTorr onto a substrate heated to >200° C. to form non-magnetic material with >~15 at. % Cr and >~8 at. % B at the boundaries.

Still other embodiments of the invention include those wherein step (b) comprises depositing the compositionally segregated exchange decoupled magnetic layer by sputtering a CoCrPtB target with >~10 at. % Pt, >~10 at. % Cr, and >~5 at. % B in a low sputter gas pressure atmosphere <~10 mTorr onto a substrate heated to >200° C. to form non-magnetic material with >~20 at. % Cr at the boundaries.

According to embodiments of the present invention, step (b) comprises depositing the compositionally segregated exchange decoupled layer to a thickness from about 5 to about 25 nm.

In accordance with embodiments of the present invention, step (b) comprises forming an exchange coupled magnetic layer comprising a non-compositionally or less compositionally segregated microstructure than the exchange decoupled magnetic layer, substantially all of the magnetic grains or particles of the exchange coupled magnetic layer are exchange coupled, and the concentrations of non-magnetic elements at boundaries between the magnetic grains or particles is relatively lower than at the boundaries of the exchange decoupled magnetic layer, or substantially zero.

Preferably, step (b) comprises forming an exchange coupled magnetic layer comprised of a Co—Pt ferromagnetic alloy. Embodiments of the invention include those wherein step (b) comprises depositing the exchange coupled magnetic layer by non-reactive sputtering of a Co—Pt target in a low sputter gas pressure atmosphere <~20 mTorr.

Alternatively, step (b) comprises depositing the exchange coupled magnetic layer by non-reactive sputtering of a Co—Pt target free of oxide material or containing less oxide material than a Co—Pt target utilized for sputter deposition of the compositionally segregated exchange decoupled magnetic layer, or step (b) comprises depositing the exchange coupled magnetic layer by non-reactive sputtering of a Co—Pt free of Cr and/or B or containing less Cr and/or B than a CoCrPtB target utilized for sputter deposition of the compositionally segregated exchange decoupled magnetic layer.

Preferably, step (b) comprises depositing the exchange coupled layer to a thickness from about 1 to about 4 nm.

Preferred embodiments of the present invention include those wherein the medium is a perpendicular magnetic recording medium and step (a) comprises providing a substrate with a soft magnetic underlayer and crystal orienting seed and underlayers formed thereon. Preferably, step (a) comprises providing a substrate with an hcp Ru underlayer with an hcp <0001> preferred growth orientation, and step (b) comprises forming each of the exchange decoupled and exchange coupled magnetic layers with an hcp <0001> preferred growth orientation. Further, step (b) preferably comprises forming an amorphous non-magnetic oxide at the boundaries of the exchange decoupled magnetic layer, the boundaries occupy greater than about 10 vol. % of the exchange decoupled magnetic layer; and substantially no amorphous non-magnetic oxide is present in the exchange coupled magnetic layer.

Other preferred embodiments of the present invention include those wherein the medium is a longitudinal magnetic recording medium, and step (a) comprises providing a substrate with crystal orienting seed and underlayers formed thereon.

Preferably, step (a) comprises providing a substrate wherein the seed and underlayers include a Cr-alloy seed layer having a bcc <200> preferred growth orientation and an underlayer of a non-magnetic hcp material oriented with a <11.0> or <10.0> preferred growth direction, and step (b) comprises forming each of the exchange decoupled and exchange coupled magnetic layers with a <11.0> or <10.0> preferred growth direction.

According to still further preferred embodiments of the present invention, step (b) comprises forming an amorphous non-magnetic oxide at the boundaries of the exchange decoupled magnetic layer, the boundaries occupy >~10 vol. % of the exchange decoupled magnetic layer; and substantially no amorphous non-magnetic oxide is present in the exchange coupled magnetic layer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

Figure 1:
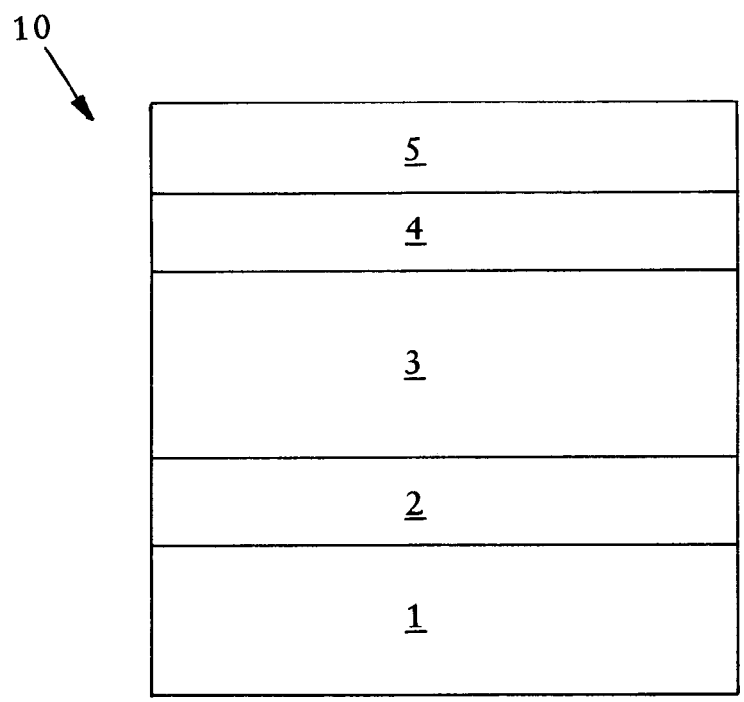
FIG. 1 schematically illustrates, in simplified cross-sectional view, a portion of a magnetic recording medium with tuned exchange coupling according to the present invention.

The present invention is based upon recognition that the above-described disadvantages, drawbacks, and problems associated with the conventional methodology for fabrication of high performance, high SNR magnetic recording media, including longitudinal, perpendicular, tilted, and heat-assisted media, may be eliminated, or at least substantially mitigated by controllably setting, or tuning, the exchange coupling of the magnetic layer(s) of the media.

More specifically, media according to the invention comprise a stacked thin film structure including at least one exchange decoupled magnetic layer and at least one exchange coupled magnetic layer in direct physical contact, wherein the exchange decoupled magnetic layer(s) contain(s) sufficient non-ferromagnetic material (concentrated at the boundaries between neighboring magnetic particles or grains) such that the amount of exchange coupling is less than optimal for the overall stacked thin film structure. By contrast, the amount of exchange coupling in the exchange coupled layer(s) is greater than optimal for the overall thin film structure and substantially all of the magnetic particles or grains are exchange coupled. Since the exchange decoupled and exchange coupled magnetic layers are adjacent in the thin film stack and thus in direct physical contact, magnetic particles or grains of the exchange decoupled magnetic layer are weakly exchange coupled via a pathway extending through the exchange coupled magnetic layer.

The above-described stacked thin film structure including exchange decoupled and exchange couple magnetic layers in direct physical contact affords a number of advantages, as follows:

1. The amount of exchange coupling between neighboring magnetic particles or grains of the exchange decoupled layer can be readily and easily controlled by appropriate selection of the thickness of the exchange coupled magnetic layer, without requiring compositional change(s) of either layer;

2. The exchange coupling is not as dependent upon the size of the magnetic particles or grains as in conventional media designs;

3. The exchange coupling is not as dependent upon preferential transport (e.g., diffusion) of selected magnetic alloy elements as in conventional media designs; and 4. Thickness control of the exchange decoupled and exchange coupled magnetic layers is precise, and the small number of atoms required for effecting tuning of the amount of exchange coupling is relatively easy to control.

According to preferred, but non-limitative, embodiments of the invention, the exchange decoupled magnetic layer comprises a cobalt (Co) and platinum (Pt)-containing magnetic alloy (Co—Pt) which includes at least one other non-magnetic (i.e., non-ferromagnetic) element, and is formed (deposited) in the form of a compositionally segregated microstructure wherein the magnetic particles or grains comprise relatively higher concentrations of Co and Pt atoms and the boundaries between neighboring magnetic particles or grains comprise relatively higher concentrations of the at least one other non-magnetic element and relatively lower concentrations of Co atoms, such that the boundaries are substantially non-magnetic.

According to preferred, but non-limitative, embodiments of the invention, the exchange coupled magnetic layer similarly comprises a cobalt (Co) and platinum (Pt)-containing magnetic alloy (Co—Pt) which may include at least one other non-magnetic element. However, in contrast with the exchange decoupled magnetic layer, the exchange coupled magnetic layer has high exchange coupling such that substantially all of the magnetic particles or grains are exchange coupled. The exchange coupled magnetic layer is deposited so as to form a non-compositionally segregated microstructure or a microstructure which is less compositionally segregated than the exchange decoupled layer. In addition, the overall concentration of non-magnetic elements, and specifically the concentration of non-magnetic elements at the boundaries between neighboring magnetic particles or grains, is lower than in the case of the exchange decoupled magnetic layer.

A sequence of basic steps for fabrication of exchange tuned magnetic recording media according to the invention includes:

1. Depositing a layer stack comprising appropriate seed and underlayers on a non-magnetic substrate, the seed and underlayers selected for the type of media (longitudinal, perpendicular, etc.) and for optimizing a selected growth orientation and microstructure of the magnetic layer(s);

2. Depositing a Co-based alloy (e.g., of Co—Pt) exchange decoupled magnetic layer on the seed/underlayer stack, the exchange decoupled magnetic layer having higher-than-conventional concentrations of non-magnetic grain boundary material(s);

3. Depositing a relatively thinner Co-based alloy (e.g., of Co—Pt) exchange coupled magnetic layer on the exchange decoupled magnetic layer, the exchange coupled magnetic layer having little or no non-magnetic grain boundary material;

4. Depositing a layer of a thin protective overcoat material (e.g., a diamond-like carbon, DLC) on the exchange coupled magnetic layer and a lubricant topcoat layer (e.g., of a polymeric material, such as a perfluoropolyether) on the protective overcoat layer.

According to a variant of the above basic sequence of steps for fabricating exchange tuned magnetic recording media, the order of performing steps 2 and 3 is reversed, i.e., the exchange coupled magnetic layer is deposited on the seed/underlayer stack and the exchange decoupled magnetic layer is deposited on the exchange coupled magnetic layer.

In either instance, controlling ("tuning") of the amount of exchange coupling of the overall magnetic layer stack to a desired value is accomplished by appropriate selection of the thickness of the relatively thinner exchange coupled magnetic layer.

Fabrication of embodiments of perpendicular magnetic recording media according to the inventive methodology will now be described in detail.

Step 1. A soft magnetic structure comprising an adhesion layer, soft magnetic underlayer (SUL), and non-magnetic lamination layer(s) is deposited on a suitable non-magnetic substrate. Preferably, the soft magnetic structure is from about 50 to about 400 nm thick. Crystal growth orienting seed and underlayers are then deposited on the soft magnetic structure. In preferred embodiments, the underlayer is a ruthenium (Ru)-containing alloy with an hcp <0001> preferred growth orientation.

Step 2. An exchange decoupled magnetic layer is deposited on the Ru-based alloy underlayer so as to grow with an hcp <0001> preferred growth orientation, and comprises a Co—Pt containing alloy including at least one other non-magnetic element. In a preferred embodiment, the Pt concentration of the Co—Pt alloy is >~15 at. %. The exchange decoupled magnetic layer is deposited so as to form a compositionally segregated microstructure wherein the magnetic particles or grains comprise higher concentrations of the Co and Pt atoms, while the boundaries between neighboring magnetic particles or grains comprise higher concentrations of the other non-magnetic elements of the Co—Pt magnetic alloy and a lower concentration of Co atoms, such that the material of the boundaries is substantially non-magnetic.

According to a preferred embodiment, the non-magnetic material of the boundaries comprises cobalt oxide (CoO) formed by reactive sputter deposition of the exchange decoupled magnetic layer. According to another preferred embodiment, the non-magnetic material of the boundaries comprises an oxide derived from another element or an oxide material included in the sputtering target. According to yet another preferred embodiment, the oxide-containing non-magnetic material of the boundaries has an amorphous appearance (as, for example, observed by plan view TEM) and comprises >~10 vol. % of the exchange decoupled magnetic layer. In preferred embodiments, the exchange decoupled magnetic layer is from about 5 to about 25 nm thick. According to still other preferred embodiments, the exchange decoupled magnetic layer is sputter deposited at a relatively high sputter gas pressure (e.g., >~20 mTorr) onto an unheated substrate, and has values of coercivity $H_c$>~4,000 Oe and nucleation field $H_n$<~0.25 $H_c$. Preferably, $H_c$>~6,000 Oe and $H_n$<~1,000 Oe, with >~20% of the layer having an amorphous appearance as observed by TEM.

Step 3. The exchange coupled magnetic layer is formed directly on the exchange decoupled layer, with high exchange coupling such that substantially all of the magnetic particles or grains are exchange coupled. Preferably, the exchange coupled magnetic layer also comprises a Co—Pt containing magnetic alloy, has a <0001> preferred growth orientation, and a Pt concentration >~15 at. %, as in the case of the exchanged decoupled magnetic layer. The exchange coupled magnetic layer is preferably deposited by sputter depositing at a relatively low sputter gas pressure (e.g., <~20 mTorr) in order to reduce (minimize) physical separation of the magnetic particles or grains by "shadowing".

According to a preferred embodiment of the invention, the exchange coupled magnetic layer is sputter deposited without reactive oxidation, so as to form a microstructure which is less compositionally segregated than that of the exchange decoupled magnetic layer. According to other preferred embodiments, the sputter target containing an oxide and utilized for deposition of the exchange decoupled magnetic layer is replaced with one which does not contain the oxide or contains a reduced amount of the oxide. In each of the embodiments, the overall concentration of non-magnetic elements, and specifically the concentration of non-magnetic material(s) at the boundaries between neighboring magnetic particles or grains is less than in the case of the exchange decoupled layer.

Preferably, the exchange coupled magnetic layer is deposited to a thickness between about 1 and about 4 nm; $H_c$ of the overall magnetic structure is between about 5,000 and about 12,000 Oe, $H_n$ is between about 1,000 and 3,000 Oe, and the squareness S>0.95. In addition, preferably there is substantially no amorphous oxide material in the exchange coupled magnetic layer, as observed by TEM.

Step 4. A protective overcoat layer, e.g., of a diamond-like carbon (DLC), is deposited in a conventional manner on the exchange coupled layer, as for example, by sputtering, and a lubricant topcoat, typically comprised of a perfluoropolyether, formed over the protective overcoat layer, also in a conventional manner.

As has been indicated supra, the order of performing the above-described steps 2 and 3 may be reversed to form additional embodiments of the invention.

Referring now to FIG. 1 schematically illustrated therein, in simplified cross-sectional view, is a portion of a magnetic recording medium 10 with tuned exchange coupling according to the present invention, wherein reference numerals 1, 2, 3, 4, and 5 respectively indicate the non-magnetic substrate, underlayer structure, exchange decoupled magnetic layer, exchange coupled magnetic layer, and protective overcoat layer.

Figure 2:
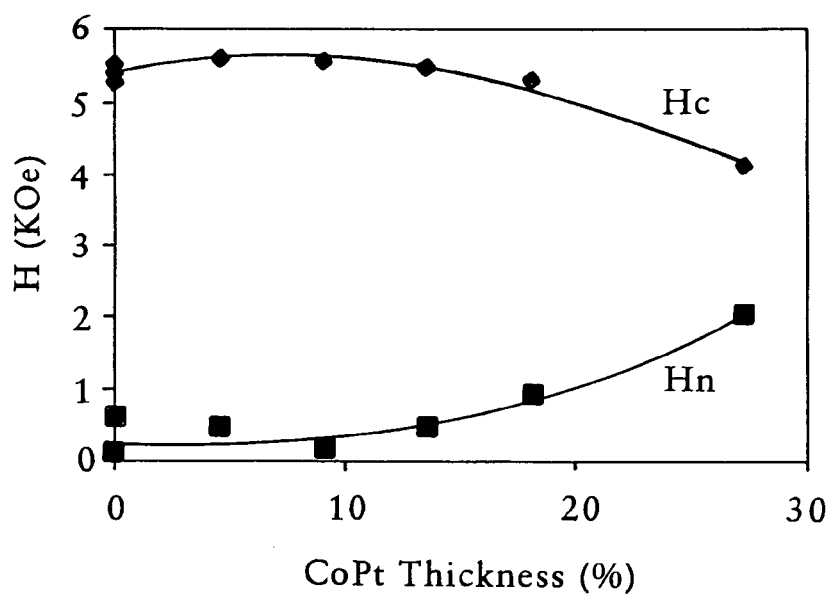
FIG. 2 is a graph for illustrating the decrease in $H_c$-$H_n$ with increasing thickness of the exchange coupled layer of media with tuned exchange coupling according to the instant invention.

Adverting to FIG. 2, shown therein is a graph illustrating the decrease in $H_c$-$H_n$ with increasing thickness of the exchange coupled layer of media with tuned exchange coupling according to the instant invention.

Additional embodiments of perpendicular media may be fabricated by suitable modification of the aforementioned steps 1 and 2, and are described below:

Step 2 (Modified). According to a preferred embodiment of the invention, the exchange decoupled magnetic layer is formed by sputter deposition at a relatively low sputter gas pressure (e.g., <~10 mTorr) onto a substrate heated to a temperature >~200° C. According to such embodiment, the exchange decoupled magnetic layer comprises >~15 at. % Pt and >~15 at. % Cr. The Cr atoms preferentially segregate at the boundaries between neighboring magnetic particles or grains to form a non-magnetic material including >~20 at. % Cr. Preferably, the exchange decoupled layer is from about 10 to about 25 nm thick, $H_c$ is >~4,000 Oe, and $H_n$ is <~25% of $H_c$.

Step 3 (Modified). Preferably, the exchange coupled magnetic layer comprises a <0001> growth oriented Co—Pt containing film including >~15 at. % Pt, as in the case of the exchange decoupled layer. Exchange coupling at the boundaries between neighboring magnetic particles or grains is increased by reducing or eliminating the Cr content of the layer. In other embodiments, Cr segregation at the boundaries may be further reduced by addition of selected impurities, reactive sputter deposition, lowering of the substrate temperature or bias voltage during sputter deposition, or by other means for reducing the mobility of adatoms during sputter deposition.

As has been indicated supra, the order of performing the above-described steps 2 and 3 may be reversed to form additional embodiments of the invention.

Fabrication of embodiments of longitudinal magnetic recording media according to the inventive methodology will now be described in detail.

Step 1. A thin film structure comprised of a crystal orienting seed layer and one or more underlayers is formed on a surface of a non-magnetic substrate, as in conventional fashion. Preferably, the seed/underlayer structure comprises a Cr-based alloy layer with bcc <200> preferred growth orientation, and may also include non-magnetic materials with hcp <11.0> or <10.0> preferred growth orientation.

Step 2. The exchange decoupled magnetic layer is deposited on the seed/underlayer structure so as to grow with an hcp <11.0> or <10.0> preferred growth orientation. Preferably, the exchange decoupled magnetic layer comprises a Co—Pt containing magnetic alloy that includes other non-magnetic (non-ferromagnetic) elements, and the Pt concentration is >~10 at. %. The exchange decoupled magnetic layer is deposited so as to comprise a compositionally segregated microstructure, wherein the magnetic particles or grains comprise relatively high concentrations of Co and Pt atoms and the boundaries between neighboring magnetic particles or grains comprise relatively high concentrations of the other non-magnetic elements and a relatively lower concentration of Co atoms, such that the boundary material is substantially non-magnetic.

According to preferred embodiments of the invention, the exchange decoupled magnetic layer comprises a CoCrPtB magnetic alloy containing >~10 at. % Cr, >~10 at. % Pt, and >~5 at. % B, and deposition is performed at a relatively low sputter gas pressure (e.g., <~10 mTorr) onto a substrate heated to a temperature >~200° C. In such embodiments, Cr and B atoms preferentially segregate at the boundaries between neighboring magnetic particles or grains to form a non-magnetic material including >~15 at. % Cr and ~8 at. % B.

Preferably, the exchange coupled magnetic layer is from about 10 to about 25 nm thick, $H_c$ is >~4,000 Oe, the non-magnetic material of the boundaries has an amorphous appearance (as observed by plan view TEM), includes >~20 at. % Cr, and occupies >~10 vol. % of the exchange decoupled magnetic layer. The exchange decoupled magnetic layer may also include Ta, Si, O, and other alloying elements. Typically, the exchange decoupled magnetic layer includes 50-70 at. % Co and have $M_s$ is from about 200 to about 500 memu/cc.

Step 3. The exchange coupled magnetic layer is formed so as to have high exchange coupling such that substantially all of the magnetic particles or grains are exchange coupled. Preferably, the exchange coupled magnetic layer comprises a Co—Pt containing magnetic alloy with >~10 at. % Pt and grown with an hcp <11.0> or <10.0> preferred growth orientation, as in the case of the exchange decoupled magnetic layer. The amount of exchange coupling at the boundaries between neighboring magnetic particles or grains is increased by reducing or eliminating the Cr and B content of the deposited Co—Pt material. Segregation of Cr at the boundaries may be further reduced by addition of selected impurities, reactive sputter deposition, lowering of the substrate temperature or bias voltage during sputter deposition, or by other means for reducing the mobility of adatoms during sputter deposition. In each instance, the overall concentration of non-magnetic elements, and specifically the concentration of non-magnetic material(s) at the boundaries between neighboring magnetic particles or grains, is lower than in the exchange decoupled layer.

Preferably, the thickness of the exchange coupled magnetic layer is from about 1 to about 4 nm. Advantageously according to the invention, the amount of exchange coupling of the overall thin film stack or structure may be "tuned" to a desired value, e.g., increased, by increasing the thickness of the exchange coupled magnetic layer.

Step 4. A protective overcoat layer, e.g., of a diamond-like carbon (DLC), is deposited in a conventional manner on the exchange coupled layer, as for example, by sputtering, and a lubricant topcoat, typically comprised of a perfluoropolyether, formed over the protective overcoat layer, also in a conventional manner.

As has been indicated supra, the order of performing the above-described steps 2 and 3 may be reversed to form additional embodiments of the invention.

Experimentally demonstrated advantages of the embodiments of the invention include:

1. The exchange coupling between magnetic particles or grains (as measured by the difference between $H_c$ and $H_n$) can be controlled ("tuned") over a range >~4,000 Oe by changing the thickness of the exchange coupled magnetic layer without changing the composition of the exchange decoupled layer;
2. Control ("tuning") of the exchange control does not require any adjustment or variation of the preferential transport (e.g., diffusion) properties of the selected elements;
3. $H_c$ can range from <~3,000 Oe to >~12,000 Oe;
4. $H_n$ can be adjusted from <~0 Oe to >~3,000 Oe; and
5. $H_n$ can be increased by >~1,000 Oe without any measured loss of SNR by increasing only the thickness of the exchange coupled magnetic layer, without changing any of alloy composition, layer thickness, and sputter deposition parameters.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A magnetic recording medium with tuned exchange coupling, comprising:
    a non-magnetic substrate having a surface;
    a stack of thin film layers on said surface of said substrate, said layer stack including:
        an hcp Ru-alloy underlayer with an hcp <0001> preferred growth orientation;
        an exchange decoupled magnetic layer comprising magnetic grains or particles overlying said underlayer, said exchange decoupled magnetic layer is compositionally segregated and grown on said underlayer with an hcp <0001> preferred growth orientation, comprises a Co—Pt magnetic alloy including at least one other non-magnetic element, said magnetic grains or particles contain relatively higher concentrations of Co and Pt than boundaries of said exchange decoupled magnetic layer, and said boundaries of said exchange decoupled magnetic layer contain relatively higher concentrations of at least one other non-magnetic element and a relatively lower concentration of Co than said magnetic grains or particles, and are substantially non-magnetic; and
        an exchange coupled magnetic layer adjacent to said exchange decoupled magnetic layer and formed in direct physical contact therewith, said exchange coupled magnetic layer has an hcp <0001> preferred growth orientation, comprises a Co—Pt alloy with >~15 at. % Pt, has a less compositionally segregated microstructure than said exchange decoupled magnetic layer, and boundaries thereof contain relatively lower concentrations of at least one other non-magnetic element and Co than other portions of said exchange coupled magnetic layer.

2. The medium as in claim 1, wherein:
the concentration of Pt in each of said Co—Pt magnetic alloys is >~15 at. %.

3. The medium as in claim 2, wherein:
said Co—Pt alloy of said exchange decoupled magnetic layer further comprises >~15 at. % Cr and said substantially non-magnetic boundaries thereof include >~20 at % Cr.

4. The medium as in claim 1, wherein:
said boundaries of said exchange decoupled magnetic layer comprise a non-magnetic oxide of Co or another metal and said boundaries of said exchange coupled magnetic layer are substantially free of non-magnetic oxide material.

5. The medium as in claim 4, wherein:
said non-magnetic oxide at said boundaries of said exchange decoupled magnetic layer is amorphous, and said boundaries occupy >~10 vol. % of said exchange decoupled magnetic layer; and
substantially no amorphous non-magnetic oxide is present in said exchange coupled magnetic layer.

6. The medium as in claim 1, wherein:
said exchange decoupled magnetic layer has a thickness from about 5 to about 25 nm; and
said exchange coupled magnetic layer is from about 1 to about 4 nm thick.

7. The medium as in claim 1, wherein:
$H_c$ of said exchange decoupled magnetic layer is >~4,000 Oe, $H_n$ of said exchange decoupled magnetic layer is <25% of $H_c$; and
$H_c$ of said medium is from about 5,000 to about 12,000 Oe, $H_n$ of said medium is from about 1,000 to about 3,000 Oe, and squareness S of said medium is >0.95.

8. The medium as in claim 1, wherein:
said medium is a perpendicular magnetic recording medium.

9. The medium as in claim 1, wherein:
substantially all of the magnetic grains or particles of said exchange coupled magnetic layer are exchange coupled, and the concentrations of non-magnetic elements at boundaries between said magnetic grains or particles is relatively lower than at said boundaries of said exchange decoupled magnetic layer.

10. The medium as in claim 1, wherein:
said layer stack includes a soft magnetic layer below said exchange decoupled and exchange coupled magnetic layers.

11. The medium as in claim 1, further comprising:
(c) a protective overcoat layer on said layer stack; and
(d) a lubricant topcoat on said protective overcoat layer.

12. A magnetic recording medium with tuned exchange coupling, comprising:
a non-magnetic substrate having a surface;
a stack of thin film layers on said surface of said substrate, said layer stack including:
    a Cr-alloy seed layer having a bcc <200> preferred growth orientation and an underlayer of a non-magnetic hcp material oriented with a <11.0> or <10.0> preferred growth direction;
    an exchange decoupled magnetic layer comprising magnetic grains or particles overlying said underlayer, said exchange decoupled magnetic layer is compositionally segregated and grown on said underlayer with a <11.0> or <10.0> preferred growth direction, comprises a Co—Pt alloy including at least one other non-magnetic element, said magnetic grains or particles contain relatively higher concentrations of Co and Pt than boundaries of said exchange decoupled magnetic layer, and said boundaries of said exchange decoupled magnetic layer contain relatively higher concentrations of at least one other non-magnetic element and a relatively lower concentration of Co than said magnetic grains or particles, and are substantially non-magnetic; and an exchange coupled magnetic layer comprises a Co—Pt alloy with a <11.0> or <10.0> preferred growth direction with a relatively lower amount of at least one other non-magnetic element than boundaries thereof, is less compositionally segregated than said exchange decoupled layer, and said boundaries thereof contain relatively lower concentrations of at least one other non-magnetic element and Co than other portions of said exchange coupled magnetic layer.

13. The medium as in claim 12, wherein:

said Co—Pt alloy of said exchange decoupled magnetic layer comprises a CoCrPtB alloy with >~10 at. % Pt, >~10 at. % Cr, and >~5 at. % B;

said boundaries of said exchange decoupled magnetic layer include >~15 at. % Cr and >~8 at. % B; and said Co—Pt alloy of said exchange coupled magnetic layer comprises a Co—Pt alloy with >~10 at. % Pt, and less than 10 at. % of Cr and B.

14. The medium as in claim 13, wherein:

said substantially non-magnetic boundaries comprise >~10 vol. % of said exchange decoupled magnetic layer and include >~20 at. % Cr.

15. The medium as in claim 14, wherein:

said substantially non-magnetic boundaries are amorphous.

16. The medium as in claim 12, wherein:

said exchange decoupled magnetic layer is from about 10 to about 25 nm thick and has a $H_c$>~4,000 Oe; and said exchange coupled magnetic layer is from about 1 to about 4 nm thick.

17. The medium as in claim 12, further comprising:

(c) a protective overcoat layer on said layer stack; and (d) a lubricant topcoat on said protective overcoat layer.

18. The medium as in claim 12, wherein:

said medium is a longitudinal magnetic recording medium.

19. The medium as in claim 12, wherein:

substantially all of the magnetic grains or particles of said exchange coupled magnetic layer are exchange coupled, and the concentrations of non-magnetic elements at boundaries between said magnetic grains or particles is relatively lower than at said boundaries of said exchange decoupled magnetic layer.

20. The medium as in claim 1, wherein:

said medium is a longitudinal magnetic recording medium.

21. The medium as in claim 1, wherein:

said layer stack includes crystal orienting seed and underlayers below said exchange decoupled and exchange coupled magnetic layers.

22. The medium as in claim 12, wherein:

said medium is a perpendicular magnetic recording medium.

23. The medium as in claim 12, wherein:

said layer stack includes a soft magnetic layer below said exchange decoupled and exchange coupled magnetic layers.

* * * * *